United States Patent [19]

Frazier

[11] 3,999,664
[45] Dec. 28, 1976

[54] TOOL CHANGER WITH DUAL AXIS OF ROTATION

[75] Inventor: James L. Frazier, Los Alamitos, Calif.

[73] Assignee: Houdaille Industries, Inc., Buffalo, N.Y.

[22] Filed: June 26, 1974

[21] Appl. No.: 483,155

[52] U.S. Cl. ............................. 214/1 BD; 29/568; 214/1 QF
[51] Int. Cl.[2] ...................................... B23Q 3/157
[58] Field of Search ......... 29/568; 214/1 BC, 1 BD, 214/1 QF

[56] References Cited
UNITED STATES PATENTS

| | | | |
|---|---|---|---|
| 3,339,273 | 9/1967 | Knosp .................................. | 29/568 |
| 3,449,822 | 6/1969 | Laumann et al. .................. | 29/568 |
| 3,608,185 | 9/1971 | Pfister ................................. | 29/568 |
| 3,619,898 | 11/1971 | Perry et al. ......................... | 29/568 |

Primary Examiner—Othell M. Simpson
Assistant Examiner—Z. R. Billinsky
Attorney, Agent, or Firm—Hill, Gross, Simpson, Van Santen, Steadman, Chiara & Simpson

[57] ABSTRACT

An automatic tool transport mechanism for a machine tool having an operating axis, in which a tool is to be transferred between the operating axis of such a machine and the storage structure, with the tool being supplied to the operating station on such operating axis, or to such a storage structure on a storage axis thereof, at least a portion of which is spaced from such operating axis, and employing a transfer arm adapted to be mounted on a machine tool for movement in a predetermined path from a first position adjacent said operating axis to a second position adjacent said space portion of said storage axis, tool gripping means carried by said arm movable in a second predetermined path operative to correspondingly orient such tool gripping means and a tool carried thereby on either said operating axis when said arm is in said first position, or on said storage axis when said arm is in said second position, means being provided for selectively actuating said gripping means to and from tool-gripping and tool-releasing position when said gripping means is operatively disposed on either such an operating axis or such a storage axis, the movements of said transfer arm and gripping means preferably being effected mechanically in fixed predetermined sequence without the use of sensors and the like.

21 Claims, 9 Drawing Figures

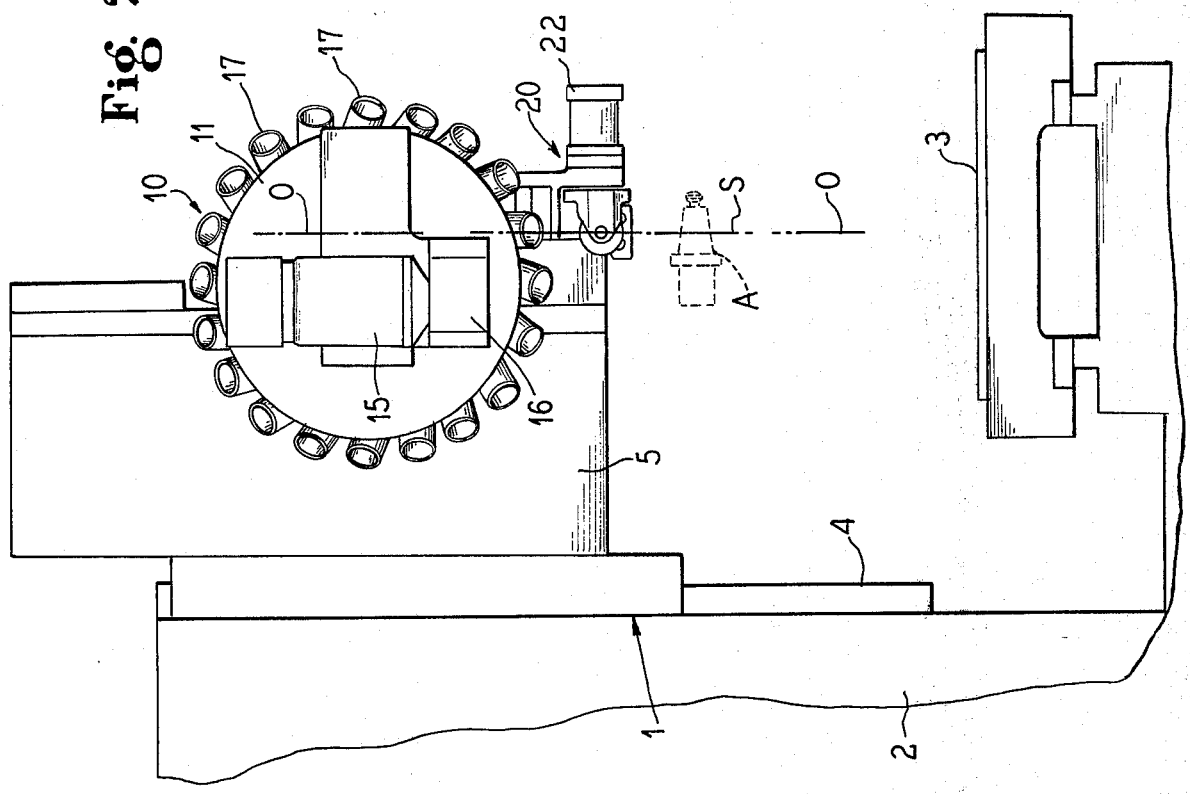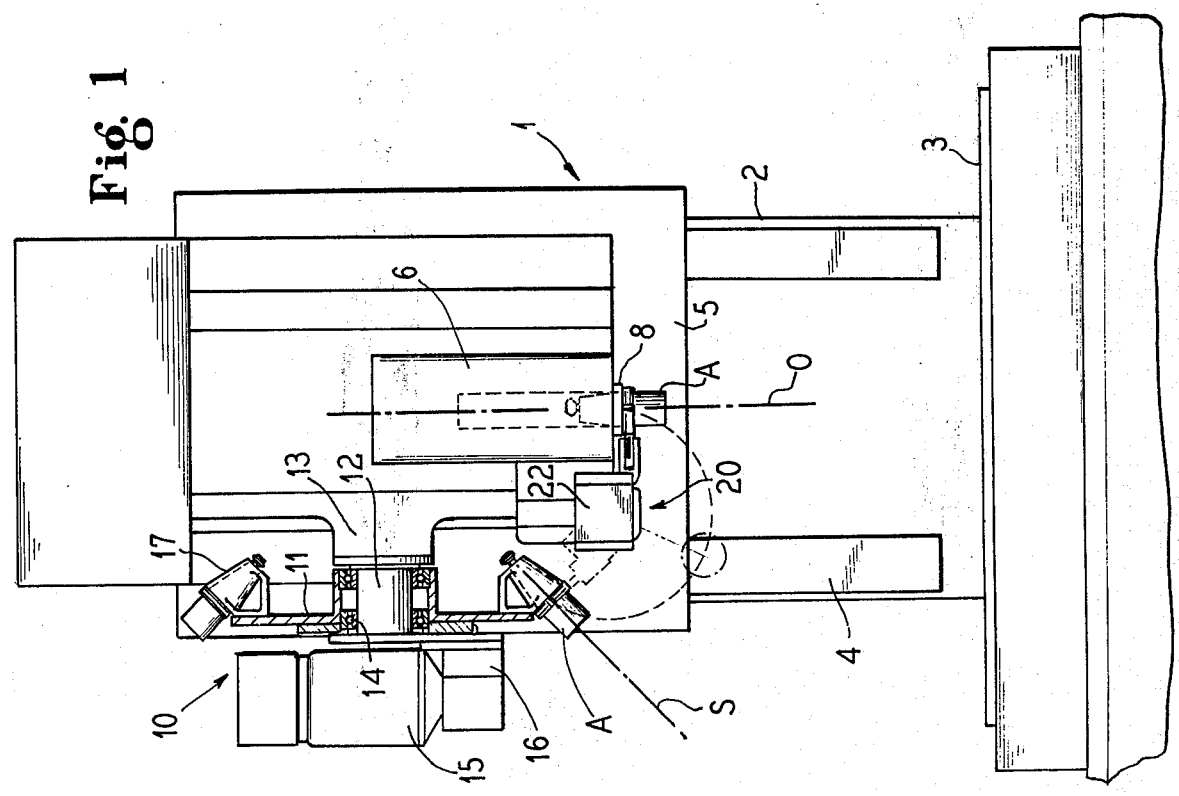

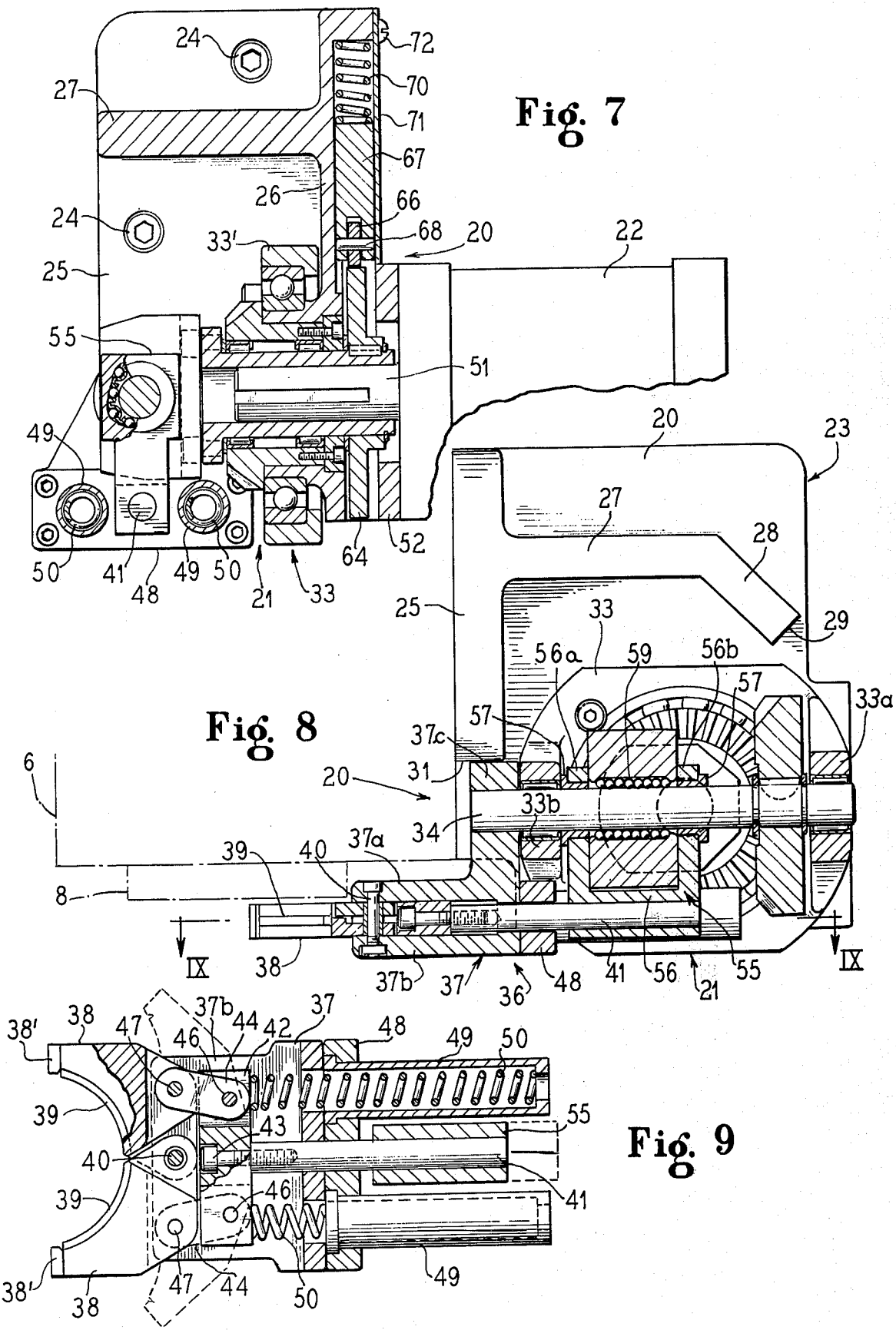

TOOL CHANGER WITH DUAL AXIS OF ROTATION

BACKGROUND OF THE INVENTION

The present invention is directed to a tool transport mechanism for machine tools in which an operating spindle may be selectively supplied with a tool, normally carried in an adjacent storage structure, with the tool being transported between the storage structure and the operating spindle of the machine by a transport mechanism which is, for example, automatically controlled by suitable equipment. Such type of machine tool and tool changer are generally disclosed, for example, in U.S. Pat. No. 3,760,490.

In the past the various functions involved in the gripping of a tool prior and during transfer, the withdrawal of the tool from the magazine and/or spindle, transfer of the tool between magazine and spindle, and the insertion of the tool in the magazine and/or spindle, were controlled by a system of actuators adapted to perform the respective functions and a system of control devices to control the actuators, with the operations being monitored by a system of sensors operable to signal the completion of each motion to insure that all motions will be performed in the desired predetermined sequence. A system of interlocks thus was required to insure that proper conditions are present following each motion before the next motion is initiated.

Likewise, usually the insertion and withdrawal of a tool from the storage means involved a different motion between the tool and the storage receiving means, than the motion involved in supplying the tool at the operating spindle. For example, in the previously referred-to patent, the tool is withdrawn axially relative to the spindle but is laterally inserted into the storage magazine. As the tool must be properly oriented when being inserted in the spindle, care must be taken to insure that a change in orientation does not occur during transfer and storage, and it will be appreciated that where the storage reception takes place, for example, in the lateral direction the relative movements involved tend to increase rather than decrease the tendency to shift in orientation.

BRIEF SUMMARY OF THE INVENTION

The invention is directed to a tool transport mechanism adapted to transport a tool between a storage area and the operating station of a machine tool, in which the various motions required to accomplish the desired results are effected in a fixed inflexible sequence which insures the completion of one step before the next step is initiated. In the preferred form of the invention illustrated, the respective sequence of the operation is effected mechanically, utilizing a single actuating means, with the various motions and operations sequentially following one another in the desired sequence.

The invention may be readily adapted for application to existing machines as well as built into new equipment and may employ merely two assemblies, one comprising the storage structure, i.e. tool magazine which may have a plurality of tool supporting pockets in which any selected pocket may be disposed on storage axis, from which it may be picked up by a transport structure, also in the form of a unitary assembly readily attachable to a machine tool, with the transport structure having a dual motion, one being a movement about a first pivotal axis to position the transfer arm of the mechanism adjacent either the operating axis of the machine, i.e. of the operating spindle, or adjacent the storage axis, and another movement about a second pivotal axis operative to reverse the position of the gripping means and thus reverse the tool adapter and a tool carried thereby end for end, whereby the adapter and tool associated therewith will be inserted into the storage structure with the same basic motion that it is inserted into the operative spindle of the tool machine. As a result, the tool adapter and tool associated therewith, during engagement and disengagement with either the spindle or the storage structure, have the same motion relative thereto, which in this case is axial as distinguished from lateral or radial, insuring that the rotational orinetation of the adapter and tool with respect to the spindle is always maintained and that the adapter and tool are not subjected to rotative forces during the tool interchange.

In a preferred form of the invention, the first pivotal transfer movement is effected by means of a suitable pneumatic actuator or the like, with the second inverting movement taking place automatically by the transmittal of rotative force, produced as a result of the first pivotal movement, being employed to effect the second pivotal movement. More specifically, such embodiment employs a pair of beveled gears, one of which is stationary and the other of which is in fixed relation to the gripping mechanism and adapted to roll on the stationary gear, whereby such rolling movement will automatically effect the desired pivotal movement.

In addition thereto, the driving torque derived from the pneumatic actuator or other power source, is coupled to the transfer arm through a novel crank arrangement, operatively connected to the gripping jaws, with the latter being spring-biased in closed position. Fixed stops are provided for bringing the arm to a halt, at either end of its first pivotal movement, whereby the actuator torque is applied through the crank mechanism, in opposition to the action of springs biasing the jaws in closed position, whereby continued rotary movement of the crank following the stopping of the transfer arm will acutate the gripping jaws to open positions.

The machine spindle and the tool receiving pockets of the magazine may be provided with suitable detent means cooperable with means on each tool adapter to insure retention of the latter in either the tool pocket or the spindle when the transfer arm has reached the corresponding end of its travel, and in the case of the spindle thus retain the adapter in the spindle until in can be firmly locked in operating position by suitable locking means (which, per se, forms no part of the present invention).

Provision is also made for insuring that the jaws when once opened will remain in such open position until a return transfer operation is initiated, even in the event of a loss of power immediately following normal opening of the jaws. Such detent means may be readily incorporated with the drive shaft of the actuator whereby such means will prevent undesired rotation of such shaft in the event there is a loss of power thereat.

BRIEF DESCRIPTION OF THE DRAWINGS

In the drawings wherein like reference characters indicate like or corresponding parts:

FIG. 1 is a front elevational view of a tool machine illustrating the application of the present invention thereto;

FIG. 2 is a side elevational view of the structure illustrated in FIG. 1;

FIG. 7 is a sectional view taken approximately on the line VII—VII of FIG. 5;

FIG. 8 is a sectional view taken approximately on the line VIII—VIII of FIG. 6; and FIG. 9 is a sectional view taken approximately on the line IX—IX of FIG. 8.

DETAILED DESCRIPTION OF THE INVENTION

General Construction

Figure 3:
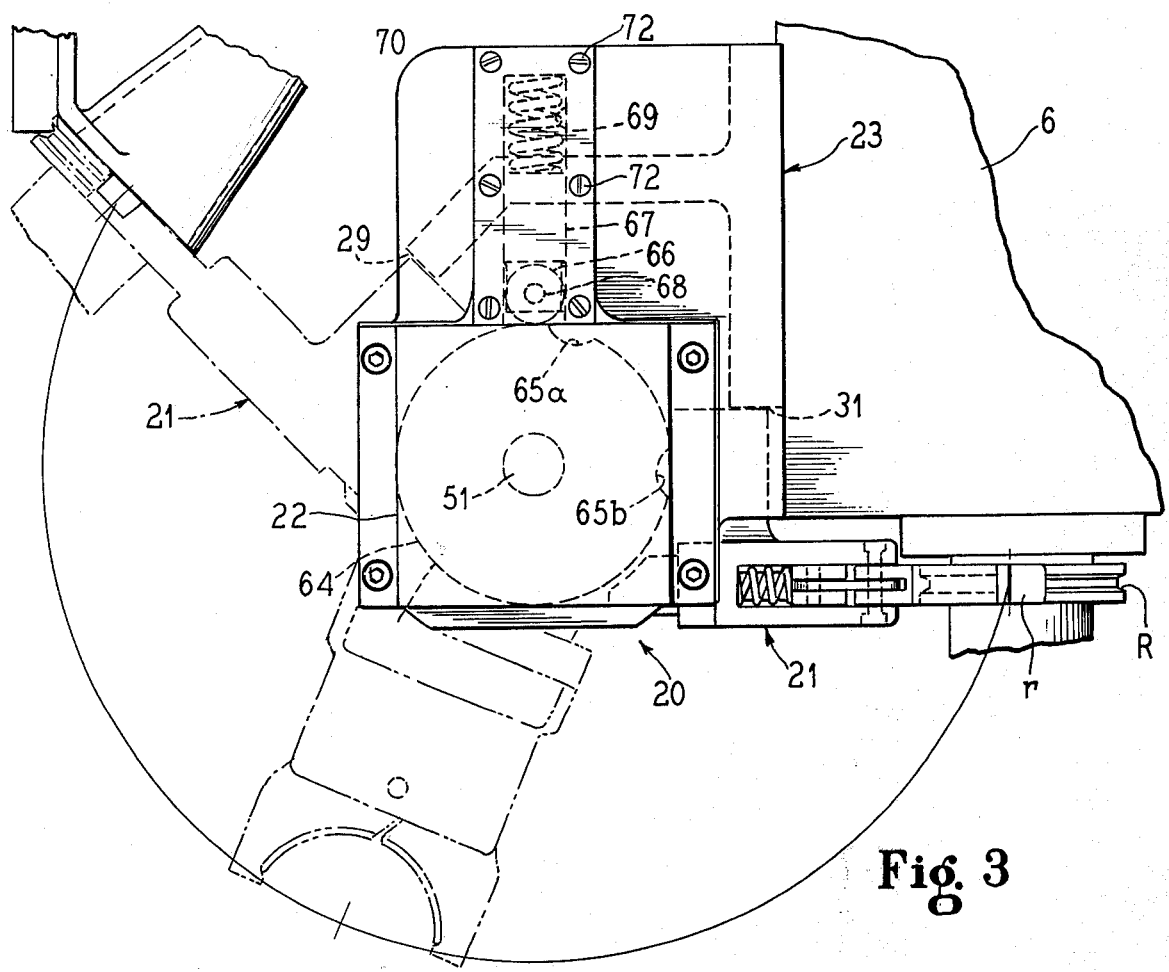
FIG. 3 is an enlarged front elevational view of the tool transport mechanism, with the storage position and an intermediate position thereof illustrated in broken lines.

Referring to the drawings and more particularly to FIGS. 1 and 2, the reference numeral 1 indicates generally a machine tool which includes a suitable frame structure 2 upon which is supported a workpiece supporting table 3 in known manner. The frame 12 is provided with a pair of vertical ways 4 on which a slide assembly 5 is slidably and adjustably disposed.

The assembly 5 is provided with a head or spindle housing 6 which carries a spindle 7, rotatable on a vertical axis, with the spindle 7 adapted at its lower end 8 to receive and support a tool supplied thereto. Thus, the slide assembly 5 may be vertically adjusted on the ways 4, and the spindle housing 6 vertically moved during the machine operation to control the action of a tool carried by the spindle 7.

The construction may, for example, be quite similar or correspond to machine tools of the type illustrated in the previously referred to U.S. Pat. No. 3,760,490, and may be suitably constructed for automatic and, if desired, also manual control.

Mounted on the slide assembly at one side thereof, i.e. the left as viewed in FIG. 1, is a tool magazine assembly, indicated generally by the reference numeral 10, which comprises a tool supporting member 11, hereinafter referred to as the "magazinek" and which is illustrated as being generally circular in configuration, pivotally supported for rotation about a horizontal axis on a stub shaft 12 which is supported from the portion 13 of the slide assembly 5, suitable bearings 14 preferably being provided between the shaft 12 and member 11. Also supported by the shaft 12 is a suitable power source 15 adapted to be operatively connected to the tool magazine 11 through a suitable indexing mechanism 16, which, for example, may be of an external Geneva type having a number of divisions corresponding to the number of tools to be carried by the magazine. The motor 15 may be of any suitable construction, as for example, of pneumatic type. The magazine 11 is provided with a plurality of tool pockets 17 corresponding in number to the number of tools to be held therein, for example 20, and selection of any desired tool may be effected by suitable coding means, as for example, embodying a coding plate and cooperable coding cams, by means of which coding switches determine, by binary code, which tool pocket is to be in tool-change position.

Indicated generally by the reference numeral 20 is a tool changer assembly, mounted on the spindle housing or head 6 at the same side of the machine as the magazine 11 and supporting a tool transfer arm 21. The latter is suitably movable to the position illustrated in FIG. 1 adjacent the spindle 8 and adapted to support a tool adapter A operatively aligned on the operating axis O of the machine, i.e. the axis of the spindle 8, or movable to a position (illustrated in dotted lines in FIG. 1) to adjacent a tool adapter A, supported in a pocket 17 disposed on the storage axis S, whereby a selected adapter and tool may be transported between the magazine and the spindle 8. The changer assembly 20 also includes a suitable motor, or actuator 22, which, for example, likewise may be pneumatically operated.

Thus, in the operation of the machine tool, assuming that a tool is not disposed in the spindle 8, upon selection of a tool in the magazine 11, the latter is suitably rotated by means of the actuator 15 to position the tool pocket 17 of the selected tool on the storage axis S, as illustrated in FIG. 1. The transfer arm 21 may be disposed in the position illustrated in broken lines in FIG. 1, in which it may suitably engage the adapter and tool assembly, move to the position illustrated in solid lines in FIG. 1, transporting the adapter and tool assembly to the spindle 8 in operative alignment on the operating axis O, and release the adapter-tool assembly when the latter has been received in the spindle 8 and supported therein.

The adapter and tool assembly may be supported in the tool pocket 17 as well as initially supported in the spindle 8 by suitable detent means, not illustrated, with the tool ultimately being locked in position in the spindle 8 in known manner, as well as interlocked with respect to rotary driving forces of the spindle on the adapter. An example of one type of such a locking structure between an adapter and spindle, as well as an example of an adapter, is illustrated in U.S. Pat. No. 3,791,257.

The Tool Changer Assembly

The tool changer assembly 20 may include its own base member 23, which may be rigidly secured to the machine tool by suitable means such as bolts 24 which, for example, may be threaded into the spindle housing or head 6. As will be particularly noted from a reference to FIGS. 5 through 8, the base member 23 is generally L-shaped in transverse cross-section, having a side or mounting wall 25 through which the mounting bolts 24 pass, and a front wall 26, extending at right angles thereto, with an intermediate generally horizontally extending wall 27 formed therewith and terminating in an angularly, downwardly directed portion 28, the free edge 29 of which forms an abutment, as hereinafter described in detail. In like manner, the wall 25 is provided with an offset 30 forming an abutment 31.

The transfer arm 21 is supported from a cylindrical extension or hub 26', illustrated as being integrally formed with the wall 26, by means of a bearing indicated generally by the numeral 32, illustrated as being of ball type, the outer race of the bearing supporting the base member 33 of the transfer arm 21. The base member 33 is of generally C-shape in transverse cross-section, having a generally cylindrical mounting or base portion 33' and respective oppositely disposed journal members 33a and 33b, in which is journalled a shaft 34, supported in the members 33a and 33b by suitable bearings such as bushings 35.

The shaft 34 is rigidly secured to and forms a part of a tool-gripping assembly 36 which, with the member 33, comprises the transfer arm 21.

Referring to FIGS. 5 and 7–9, the tool-gripping assembly 36 comprises a body member or block 37 of generally L-shape, having a horizontally extending portion which is bifurcated to form parallelly extending portions 37a and 37b with the shaft 34 being rigidly secured to the upstanding portion 37c, whereby the latter may pivot with the shaft about its axis.

Carried by the member 37 are a pair of tool clamping jaws 38 which are provided at their outer ends with suitably contoured tool-engaging faces 39, while at their inner ends extend between the portions 37a and 37b and are pivoted thereto by a common pivot pin or bolt 40.

The jaws 38 are adapted to be actuated by an elongated rod-shaped actuating member 41, which in the embodiment illustrated, is provided with a cross member 42, rigidly secured thereto by suitable means, such as a screw 43, with the cross member being connected to the jaws 38 by respective links 44, each of which is pivotally secured to the cross member 42 by a respective pin 46 and to a prespective jaw by a cooperable pin 47. Thus, by suitable reciprocation of the actuating member 41 relative to the body 37, the jaws may be moved either to or from a closed position illustrated in solid lines in FIG. 9, or(to) open position, illustrated in FIG. 9, by broken lines.

Also, secured to the supporting member 37 by a mounting block 48, bolted thereto, are a pair of tubular housings 49 each adapted to house a coil compression spring 50 with one end of each spring engaging the cross member 42 and the other ends engaging the adjacent end of the associated tubular housing 49.

Suitably secured to the base member 23 is a suitable power source 22 for actuating the tool changer assembly which, for example, may be in the form of a pneumatic or hydraulic rotary actuator of the vane type, readily procurable in commerce. Assuming that the power source or actuator 22 is of this type, available with a shaft rotation of 280°, the actuator is so secured to the base member 23 that the drive shaft 51 thereof is concentric on the axis of rotation of the member 33 on the bearing 32. The actuator may be secured to the base member 23 by suitable means, for example, by means of a generally annularly-shaped plate 52 on which the actuator is mounted and the plate bolted or otherwise secured to the base 23.

Carried by the shaft 51 is an eccentric portion indicated generally by the numeral 53 which extends from an elongated hub portion 54 which receives and is keyed to the shaft 52 for rotation therewith. Referring in particular to FIGS. 6 through 9, rigidly secured to the actuating member 41 is an actuating block 55 which is of generally C-shaped configuration as viewed in FIG. 8 having an intermediate portion 56 and respectively vertically extending portions 56a and 56b are respectively provided with bushings 57 through which the shaft 34 extends.

Figures 5, 6:
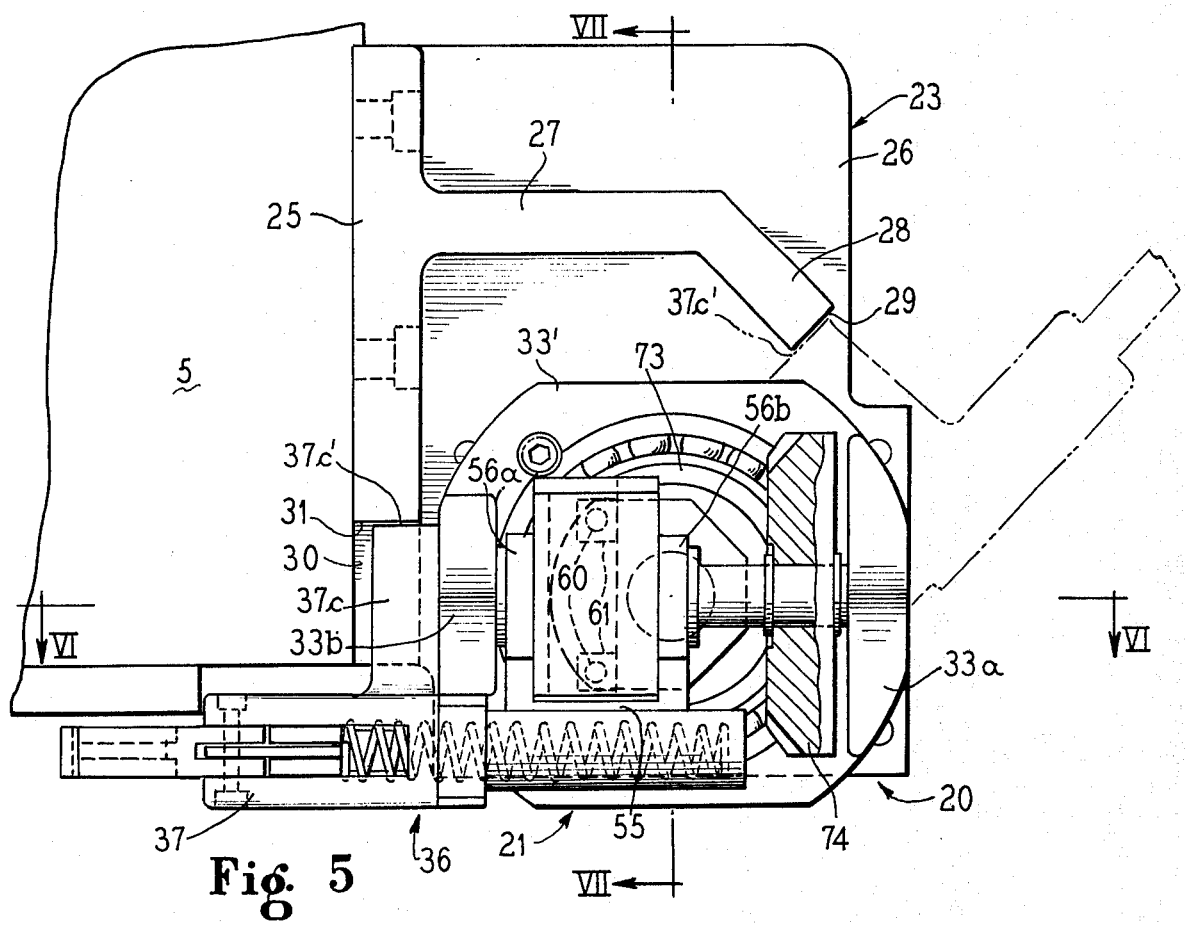
FIG. 5 is a rear elevational view of the transfer mechanism, illustrating the same in operative position at the spindle of the machine tool, i.e. corresponding to that of FIG. 3, with the mechanism illustrated, in broken lines, in the storage position.
FIG. 6 is a sectional view taken approximately on the line VI—VI of FIG. 5.

The eccentric portion 53 is operatively connected with the actuating block 55 by a connecting block 58 disposed between the portions 56a and 56b of the member 56 and suitably journalled on the shaft 34 for both relative rotary and axial movements, for example, by means of a so-called ball bushing 59 of the recirculating type, whereby the connecting member 58 is slidable along the shaft 34 with a minimum friction, as well as supported for rotary movement of the shaft relative thereto. As particularly illustrated in FIGS. 5 and 6, the eccentric portion 53 is operatively connected with the block 58 by a pair of pins 60 which are disposed in vertical alignment, as illustrated in FIG. 5, above and below the axis of the shaft 34, with the free ends of the pins being disposed in respective associated bearing blocks 61 positioned in a vertically extending groove or channel 62 in the block 58, with the respective blocks 61 bearing against the adjacent vertical wall 63 thereof, thus forming a double crank arrangement.

It will be noted that due to the rigid connection of the member 56 to the actuating rod 41 of the jaw assembly, the springs 50 will tend to urge the actuating rod 41 in a direction toward the left as viewed in FIGS. 5, 6, 8 and 9, thus tending to maintain the block 58 and associated parts in the positions illustrated in such figures. Consequently under such conditions, upon actuation of the acutator 22 to appropriately rotate the shaft 51 thereof, the rotary torque of the shaft will be transmitted through the eccentric portion 53 to the block 58 and thereby to the member 56, with the applied forces acting through one of the pins 61 and associated structure, in dependence upon the direction of rotation of the shaft.

However, in the event that the transfer arm is free to move in the direction of rotation of the shaft 51, i.e. the transfer arm is not at the end of its travel in such direction, as the forces of the springs 50 are much greater than any frictional forces opposing pivotal movement of the transfer arm in such direction of the shaft 51, the assembly will function as a single unitary structure and thus rotate with the shaft. If, during such rotation of the shaft 51, the rotation of the transfer arm is immobilized with further movement being prevented, continued rotation of the shaft may take place, with such additional rotation resulting in a camming movement between the block 61 of the driving pin involved with respect to the block 58, causing the latter as well as the member 56 and actuating rod 41 to move to the right, as viewed in FIGS. 5, 6, 8 and 9, compressing the springs 50 and through the links 44 opening the jaws 38.

To insure retention of the jaws in open position, should power on the actuator 22 fail at such time, means are provided to retain the jaws in open position until the actuator 22 is suitably operated in opposite direction. Such means is illustrated in FIGS. 6 and 7 and comprises a disc 64 rigidly mounted on the elongated hub portion 54, which in turn is keyed to the shaft 51 and thus rotates therewith. As illustrated in FIG. 3, in dotted lines, the disc 64 is provided with a pair of semi-cylindrical notches 65a and 65b therein which are cooperable with a vertically movable detent roller 66 rotatably mounted on a vertically movable block 67 by means of a pin 68, supported in such block, with the latter being vertically slidable in the channel 69 and biased in a downward direction by a compression spring 70. The channel 69 may be closed by a cover plate 71 secured to the base 23 by screws 72, or other suitable means, to retain the parts in operative assembled relation.

As previously described, and as will be apparent from a reference to FIGS. 3, 5 and 8, the abutments 29 and 31, carried by the base member 23 are adapted to provide stop means for the transfer arm 21 at the ends or limits of its travel about the axis of the drive shaft 51, such abutments being cooperable with the top edge 37c of the portion 37c of the jaw supporting member 37. FIG. 5 illustrates in solid lines engagement of such top edge with the abutment 31, and illustrates in broken lines engagement of such edge with the abutment 29.

It will be noted that to achieve such operation, the jaw supporting structure must be rotated 180° about the shaft 34, thereby properly positioning the jaw-supporting assembly for the desired engagement with the abutments 29 or 31. Such rotation is accomplished automatically, in the illustrated embodiment of the present invention, by means of a pair of bevel gears 73 and 74. The gear 73 is rigidly secured to the portion 26' of the base member 23, by means of a hub portion 75 disposed in the portion 26' and secure therein with respect to rotation by suitable keying means or the like (not illustrated), with the gear being secured to such portion of the base member by a lock ring 76 seated on a shoulder formed on the member 26', with the lock ring secured to the gear by a plurality of screws 77. As will be apparent from a reference to FIG. 6, suitable bearing means 78 may be provided between the internal surface of the hub 75 and the external surface of hub portion 54. In like manner, the gear 74 is rigidly connected to the shaft 34 by a key or other suitable means (not illustrated) with axial movement of the gear on the shaft being prevented by suitable means, such as split retaining rings 79 and 80.

It will be apparent that, it the event the base member 33 of the transfer arm 21 is rotated on the axis of the shaft 51, the gear 74 on the shaft 34 will roll on the stationary gear 73, thereby correspondingly imparting rotary movement to the shaft 34 and the gripping assembly 36 rigidly connected therewith.

As previously mentioned, actuators of the type described may be readily procured having a shaft rotation of 280°. Consequently, assuming for example that the rotation of the transfer arm about the axis of the shaft 51 is to be 225° and rotation of the shaft 34 to be 180° the gears 74, 73 would have a ratio of 5:4 and the abutments 29, 31 would be correspondingly disposed to provide a travel of 225°. If a different travel is required, the ratio of the gears may be correspondingly altered to achieve the desired results.

Operation

Referring to FIGS. 1, 2 and 3 and assuming that the transfer arm 21 has a rotary travel about the axis of the shaft 51, as previously described, when the device is mounted on the machine tool 1 and cooperable with the magazine II the axis of the shaft 34, operating axis O and storage axis S all will be disposed in a common plane, with the axes O and S being disposed at an angle of 225°therebetween, and with the axis of the shaft 51 extending normal to such plane and intersecting a line bisecting the angle between the operating and storage axes, whereby a tool adapter A, and associated tool, supported in the gripping jaws 38 may be transported from a position on the axis O and in engagement with the spindle 7 to a position on the axis S in engagement with the cooperable tool pocket 17.

In considering the entire operation of the mechanism relative to the machine tool, it will be assumed that the tapered tool adapter A is provided with a gripper engaging ring R adapted to receive cooperable end faces 39 of the gripping jaws 38, with the ring having diametrically opposite radial notches r therein for orienting the tool with respect to the spindle as well as providing rotary interlocking between the spindle and the tool, for example, a construction such as illustrated in said U.S. Pat. No. 3,791,257.

In the embodiment of the invention illustrated, reference being made particularly to FIGS. 8 and 9, the free outer ends of the jaws 38 each carry a block 38' which are so disposed that when the jaws are in closed position, operatively engaging the ring R of a tool carrying adapter A, the blocks 38' will enter the respective notches r and thus maintain the desired orientation of the adapter with respect to the spindle. To insure easy entry of the blocks 38' into the notches r, the blocks may be beveled or chamfered at their corresponding inner edges.

Figure 4:
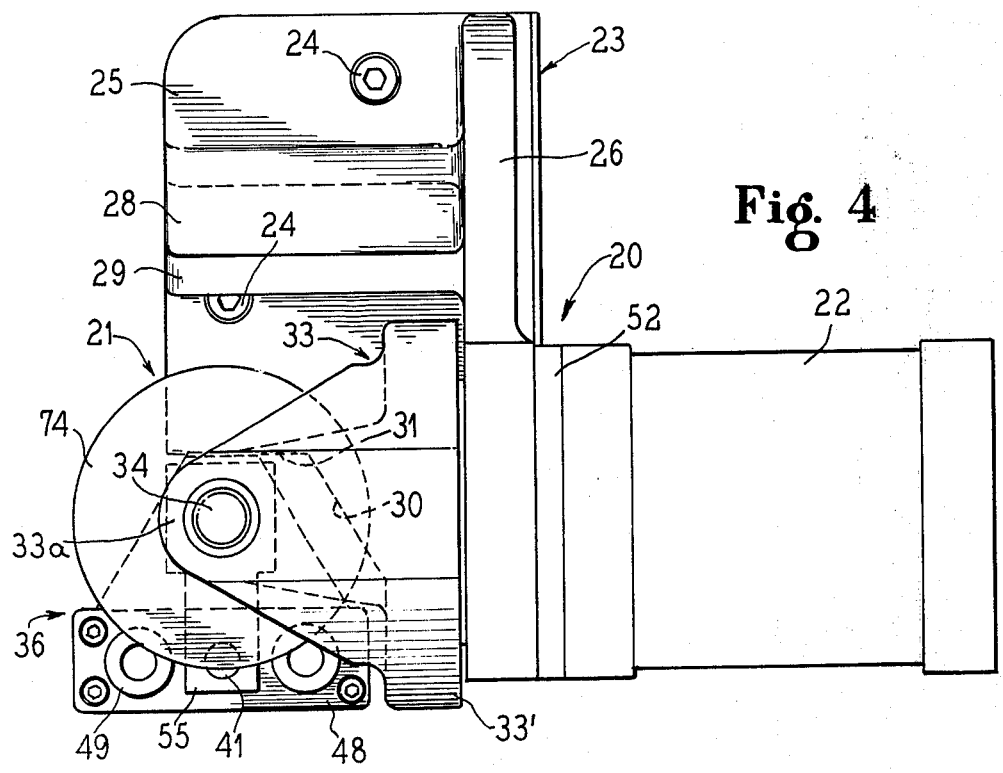
FIG. 4 is an end elevational view, corresponding to that of FIG. 2, of the transfer mechanism.

Assuming that the slide 5 and spindle assembly 7 is of generally standard construction, with suitable spindle orient, tool lock and unlock mechanism and tool lock and unlock sensors, and also assuming that the transfer arm 21 is in substantially the position illustrated in FIG. 1 with the gripping jaws 38 engaging the tool adapter A, upon actuation of the shaft 51 in a clockwise direction as viewed in FIGS. 1 and 3, the transfer arm 21 will begin to move in an arc, with the base member 33 of the transfer arm rotating with the shaft 51 about the axis of the latter. Simultaneously with this pivotal movement of the member 33, the gear 74 will begin a rolling movement about the gear 73, thereby effecting rotary movement of the shaft 34 and with it the gripping assembly 36. Such rotation will take place in a clockwise direction, as viewed in FIG. 4, and when the transfer arm has moved one-half of its travel from the axis O to the axis S the gripping assembly will have pivoted 90° to bring the adapter A into the positions illustrated in broken lines in FIGS. 2 and 3, i.e. with the axis of the adapter extending horizontally. Such movement will continue until the member 37 of the gripping assembly has rotated 180° about the axis of the shaft 34, at which time the end face 37c'thereof will engage the abutment 29, thereby restraining further movement of the transfer arm. However, the torque applied from the shaft 51 to the crank 60, 54 will then overcome the action of the springs 50, resulting in a further pivotal movement of the shaft 51 and crank 60, 54. As the movement of the shaft 51 is in a counterclockwise direction as viewed in FIG. 5, it will be apparent therefrom that the lowermost pin 60 and block 61 will exert forces on the block 58 to move the latter toward the right as viewed in FIG. 5, such movement carrying with it the connecting member 55 and thus axially moving the actuating rod 41 to the right as viewed in FIGS. 8 and 9. This movement will result in movement of the cross arm 42, thereby moving the links 44 in a direction to open the jaws 38 to the dotted positions illustrated in FIG. 9.

As previously mentioned, the tool adapter A normally will be provided with suitable detent means engageable with cooperable means on the spindle whereby the adapter will be retained in the spindle when the locking means therefor has been released, remaining in such position until withdrawn therefrom by the transfr arm. In like manner, the cooperable tool receiving cup 17 may be provided with means cooperable with the first mentioned detent means on the adapter to retain the adapter in its associated pocket until further use of the tool is required. In the event a different tool is to be supplied, the magazine 11 is rotated by suitable automatic commands, and by means of the indexing mechanism 16. The magazine is stopped when the desired tool has reached the storage axis S, the gripping jaws 38 as illustrated in FIG. 9, opening sufficiently wide to permit rotation of the magazine without interference.

Likewise, as previously mentioned, the detent plate 64 and roller 66 prevent the jaws from closing in the event of a power failure at the actuator 22. It will be appreciated that such action of the detent mechanism 64, 66 must present greater retaining forces on the shaft 51 that those exerted thereon by the springs 50 and associated mechanism, but with the acutator 22 having sufficient torque to readily overcome the detent action, and permit the jaws to close. The return movement to the spindle will then take place in reverse order to that described with respect to travel from the spindle to the storage axis, with such movement continuing until the transfer arm assumes the position illustrated in FIG. 5, at which time the assembly 36 has pivoted 180° on the axis of the shaft 34 and the entire arm has traveled through arc of 225° about the axis of the shaft 51. At this time the face 37c' of the gripping assembly 36 will engage the abutment 31. The arm thus comes to a stop in such position, with the tool adapter inserted into the spindle and engaged with the retaining detent means thereof, while continued rotation of the shaft 51 actuates the block 58, member 56 and actuating rod 41 to move the gripping jaws 38 to their open position, and thereby provide clearance for operating movement of the spindle, tool adapter and tool carried thereby.

It will be appreciated that from the time the shaft 51 begins to rotate in the desired direction to the time the gripping jaws open to release the tool adapter, all intervening steps must take place positively in predetermined sequence, whereby a step-by-step monitoring of such operation, through appropriate sensors, is completely eliminated and the entire operation may be monitored merely at each end of the operation, for example, by an appropriate sensor which will be actuated when engagement of the arm is made with the cooperable stop 29 or 31, or a single sensor which is operable when the detent roller 66 is in operative position in the cooperable recess 65a or 65b on the disc 64. Such a sensor could be actuated, for example, by appropriate movement of the roller carrying block 67. Where the sensors involve engagement with the appropirate abutment 29 or 31, if deemed desirable or necessary, appropriate delay may be incorporated in connection with the operation of such sensor to provide adequate time to insure opening of the grippers.

As the tool changing operation would normally take place when the slide assembly is in a tool-change position, i.e. is in an upper position with respect to the bed 3, appropriate monitoring sensors may be provided to insure that the transfer arm is not actuated until the slide has reached the desired tool change position, at which time the appropriate sensors and tool lock and unlock mechanism will be acutated to provide the desired sequence of operation.

It will be particularly noted from the above description that I have provided a relatively simple and compact tool changing assembly, with the magazine structure therefor being well above the tool receiving end of the spindle and the tool transfer mechanism being disposed relatively out of the way of the operation of the tool. It also will be noted that the storage axis S not only is disposed in a vertical plane containing the operating axis O, but is also disposed forwardly of the axis of the magazine, i.e. the magazine axis is positioned rearwardly toward the ways 4 so that a minimum portion of the magazine protrudes forwardly beyond the front face of the slide and spindle structure.

It will also be appreciated that as the adapter and tool carried thereby, in its travel between the operating and storage axes, in horizontal midway of its travel which is closely adjacent to the lowermost point of travel, the tool is rotated out of the way with respect to the bed or table 3 so that the clearance distance between table and spindle, i.e. height of the slide in tool-change position may be at a relatively low position as compared with an arrangement in which the tool would remain upright through such travel. In other words, the dual movement of the gripping means quickly moves the tool away from the machine table 3, and as the storage axis S is at an angle the tools, per se, when in storage position, are disposed at a location which is relatively remote from the machine table and in a location which presents little or no interference with substantially all operations of the machine. Likewise, the construction and location of the tool changing assembly is such that it introduces a minimum of bulk below the spindle structure when the latter is in its uppermost position so that it presents no obstruction to all of the normal operations to be performed on the machine.

It will also be appreciated that while I have illustrated merely a single magazine and tool changing assembly, the components may be readily disposed at opposite sides of the slide 5 to provide a dual structure, doubling the number of tools which may be associated with the machine. In such case the tool pockets and other components of the apparatus may be suitably reversed to provide the desired results.

It will also further be appreciated that while I have illustrated a specific configuration of tool transfer arm and tool magazine cooperable therewith, the arm may be suitably configured and the angle of rotation about the axis 51, as well as rotation about the shaft 34, may be readily varied to accommodate a transfer of the tool from the operating axis to a storage axis suitably disposed to meet a specific application. In this connection it will be noted that the only substitution involved in effecting such changes, outside of a possible change in configuration of the arm, would be the substitution of gears 73 and 74 of different ratio than that illustrated. Change in transfer travel from operating axis to storage axis, other than such gear change to insure proper orientation of the gripper jaws, is not required as the transfer arm may be stopped at any point along its maximum travel, by suitable abutment or other stop means, engagement with which will result in the subsequent actuation of the gripping jaws to open position. In other words, no change whatsoever is required in the jaw actuating means, as actuation will take place as soon as the arm is rendered stationary in engagement with an appropriate abutment. It will also be appreciated that as a result of this general operation the amount of rotation of the actuator is not critical, the only requirement being that the travel is sufficient to accommodate the desired actuation of the transfer arm, and it will not be necessary to use an actuator having a specific limited rotary travel.

It will further be noted that in view of the novel actuation of the gripper jaws, in which they are retained in the close position by the spring 50 and mechanically opened only after the transfer arm has reached a stationary position, there is no possibility of the jaws inadvertently opening during tool transfer, as the inherent construction requires that the arm reach a stationary position before opening of the jaws is effected.

Having thus described my invention, it will be apparent that various minor modifications might be suggested by those versed in the art, it should be understood that I wish to embody within the scope of the patent granted hereon all such modifications as reasonably, and properly come within the scope of my contribution to the art.

I claim as my invention:

1. In a tool transport mechanism for a machine tool having an operating axis on which a tool is operable, and in which a tool is to be transferred between the operating axis of the machine and a tool storage structure having tool-receiving means for supporting a tool on a storage axis, as least a portion of which is spaced from said operating axis, with the tool being supplied to the operating station in predetermined orientation on said operating axis, the combination of a transfer arm supported on a fixed first pivotal axis, at least a portion of which is spaced from said operating and said storage axes, for pivotal movement from a first position adjacent said operating axis to a second position adjacent said storage axis, said transfer arm having gripping means for releasably gripping a tool positioned either on said operating axis or on said storage axis, means connected to said transfer arm for effecting a pivotal movement of said tool gripping means and a tool carried thereby, about a second pivotal axis extending in a direction transversely to that of said first pivotal axis for selectively orienting said tool-gripping means, and such a tool carried thereby on said operating axis when said arm is in said first position, and on the axis of said tool-receiving means, in a relative position corresponding to said predetermined orientation thereof on said operating axis, when said arm is in said second position, whereby said tool is deposited at said tool-receiving means for support thereby, means including a power source having a drive member rotatable on said first pivotal axis, yieldable means coupling said drive member to said transfer arm for rotating the latter therewith, means for restricting further pivotal movement of said transfer arm, in opposition to said yieldable coupling means, when said arm reaches either its first or second positions and actuating means operatively connecting said gripping with said coupling means, whereby, upon yielding of said coupling means, continued movement of said drive member is operative to actuate said tool-gripping means to tool-releasing position.

2. A tool transport mechanism according to claim 1, wherein said transfer arm comprises a base member pivotally supported on said first fixed pivotal axis, and said gripping means comprises a pair of cooperable gripping jaws pivotally supported from a cooperable supporting member, said supporting member being pivotally supported on said base member for pivotal movement on said second pivotal axis, said yieldable coupling means operatively connecting said drive member with said base member for effecting said pivotal movement thereof, means for effecting pivotal movement of said supporting member relative to said base member about said second pivotal axis, said actuating means comprising linkage connected to said gripping jaws, including an acutating member for effecting predetermined movement of said linkage and thus of said jaws, and means operatively connecting said actuating member to said yieldable coupling means for effecting jaw actuating movement thereof when said gripping means is operatively disposed at either said storage or operating axes.

3. A tool transport mechanism according to claim 2, wherein said means for moving said supporting member relative to said base member comprises a shaft journaled in said base member on said second pivotal axis, said shaft being rigidly connected to said jaw supporting member whereby the latter is movable therewith, a stationary bevel gear concentric with said first pivotal axis, a second bevel gear rigidly carried by said shaft, with pivotal movement of said arm about said first pivotal axis being operatively transmitted to said shaft, whereby the latter and said gripping means is pivoted about said second axis during movement of said base member about said first axis.

4. In a tool transport mechanism for a machine tool having an operating axis on which a tool is operable, and in which a tool is to be transferred between the operating axis of the machine and a tool storage structure having tool-receiving means for supporting a tool on a storage axis, at least a portion of which is spaced from said operating axis, with the tool being supplied to the operating station in predetermined orientation on said operating axis, the combination of a transfer arm supported for pivotal movement on a fixed first pivotal axis, at least of portion of which is spaced from said operating and said storage axes, said transfer arm having a base member pivotally supported on said first fixed pivotal axis, means including a power source having a rotary drive shaft the axis of which is aligned on said first pivotal axis, a crank operatively carried by said drive shaft, means operatively connecting said crank with said base member for transmitting rotary motion of said drive shaft thereto for moving the base member from a first position adjacent said operating axis to a second position adjacent said storage axis, gripping means for releasably gripping a tool positioned either on said operating axis or on said storage axis, said gripping means comprises a pair of cooperable gripping jaws pivotally supported from a cooperable supporting member, said supporting member being pivotally supported on said base member whereby said tool gripping means and a tool carried thereby may be pivotally moved about a second pivotal axis extending in a direction transversely to that of said first pivotal axis for selectively orienting said tool-gripping means, and such a tool carried thereby on said operating axis when said arm is in said first position, and on the axis of said tool-receiving means, in a relative position corresponding to said predetermined orientation thereof on said operating axis, when said arm is in said second position, whereby said tool is deposited at said tool-receiving means for support thereby, a shaft journaled in said base member on said second pivotal axis, said shaft being rigidly connected to said jaw supporting member whereby the latter is movable therewith, a stationary bevel gear concentric with said first pivotal axis, a second bevel gear rigidly carried by said shaft, with pivotal movement of said arm about said first pivotal axis being operatively transmitted to said shaft, whereby the latter and said gripping means is pivoted about said second axis during movement of said base member about said first axis, actuating means connected with said arm for selectively operating said gripping jaws to and from tool-gripping and tool-releasing positions respectively when said gripping jaws are operatively disposed at either said operating or said storage axes, said actuating means comprising linkage connected to said gripping jaws, and an actuating member for effecting predetermined movement of said linkage and thus of said jaws, said crank-connecting means also being operatively connected to said jaw-actuating member and movable to actuate said jaws to open position, resilient means opposing such movement of said connecting means, and fixed stop means engageable with said arm at opposite ends of its travel to stop movement of said arm at said first or second positions, respectively, whereby continued movement of said rotary drive shaft and crank is operable to effect movement of said actuating member in jaw-opening direction.

5. A tool transport mechanism according to claim 4, wherein the direction of movement of said actuating member is parallel to the axis of said pivotal shaft carried by said transfer arm, said crank-connecting means comprising a driven member rigidly connected to said actuating member and a driving member slidably mounted on said pivotal shaft and engageable with said driven member for transmitting movement to the latter in jaw-opening direction, and means operatively connecting said crank with said driving member for transferring rotative movement of said drive shaft in either direction from a normal neutral point, to axial movement of said driven member in jaw-opening direction.

6. A tool transport mechanism according to claim 5, wherein said resilient means comprises at least one compression spring disposed to normally maintain said jaws in closed position.

7. A tool transport mechanism according to claim 6, wherein said operating, storage and second pivotal axes are disposed in a common plane.

8. A tool transport mechanism according to claim 7, wherein said first pivotal axis is perpendicular to said plane.

9. A tool transport mechanism according to claim 8, wherein said first pivotal axis intersects said second pivotal axis.

10. A tool transport mechanism according to claim 6, comprising in further combination, detent means rotatable with said drive shaft and engageable with cooperable means when said drive shaft is in a jaw-opening position, to retain said jaws in open position, against the action of said resilient means in the event of a failure of power at said power source.

11. A tool transport mechanism according to claim 2, comprising in further combination, resilient means carried by said transfer arm disposed to normally maintain said jaws in closed position.

12. A tool transport mechanism according to claim 1, wherein said operating, storage and second pivotal axes are disposed in a common plane.

13. A tool transport mechanism according to claim 12, wherein said first pivotal axis is perpendicular to said plane.

14. A tool transport mechanism according to claim 13, wherein said first pivotal axis intersects said second pivotal axis.

15. A tool transport mechanism according to claim 1, comprising in further combination, detent means rotatable with said drive member and engageable with cooperable means when said arm is at either end of its travel and said jaws are in open position to restrict movement of the drive member and thereby retain said jaws in such open position until said arm is moved out of such end position.

16. A tool transport mechanism according to claim 1, wherein said first pivotal axis is perpendicular to a plane containing said operating axis.

17. A tool transport mechanism according to claim 1, wherein said first pivotal axis intersects the axis of said second pivotal axis.

18. A tool changing mechanism according to claim 1, wherein said gripping means includes a pair of gripping jaws which are operative to engage circular means on a tool-carrying adapter for approximately half of the circumference of such circular means.

19. A tool changing mechanism according to claim 18, wherein such cylindrical means of a tool carrying adapter is provided with a pair of diametrical notches therein, and said jaws are provided with respective inwardly directed projections, each adapted enter a respective one of said notches.

20. A tool changing mechanism according to claim 6, wherein said gripping jaws are operative to engage circular means on a tool-carrying adapter for approximately half of the circumference of such circular means.

21. A tool changing mechanism according to claim 20, wherein such cylindrical means has a pair of diametrical notches therein, and said jaws are provided with respective inwardly directed projections, each adapted to enter a respective one of said notches.

* * * * *